United States Patent
Satgunam

(10) Patent No.: US 10,321,280 B2
(45) Date of Patent: Jun. 11, 2019

(54) REMOTE CONTROL OF A DEVICE VIA TEXT MESSAGE

(71) Applicant: Verizon and Redbox Digital Entertainment Services, LLC, Basking Ridge, NJ (US)

(72) Inventor: Mark Satgunam, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 468 days.

(21) Appl. No.: 14/097,948

(22) Filed: Dec. 5, 2013

(65) Prior Publication Data

US 2015/0161883 A1  Jun. 11, 2015

(51) Int. Cl.
*H04W 12/06* (2009.01)
*H04W 4/14* (2009.01)
*G08C 17/02* (2006.01)

(52) U.S. Cl.
CPC .............. *H04W 4/14* (2013.01); *G08C 17/02* (2013.01); *G08C 2201/93* (2013.01)

(58) Field of Classification Search
CPC ......................... G07C 9/00111; G07C 9/00309
USPC ................................................... 340/5.8, 5.6
See application file for complete search history.

(56) References Cited

U.S. PATENT DOCUMENTS

| 8,204,827 B1* | 6/2012 | Gupta | G06F 9/4443 705/30 |
| 2004/0132530 A1* | 7/2004 | Rutanen | G07F 17/32 463/42 |
| 2006/0158368 A1* | 7/2006 | Walter | G08C 17/02 341/176 |
| 2010/0031296 A1* | 2/2010 | Elias | H04N 7/17318 725/54 |
| 2014/0120901 A1* | 5/2014 | Ward | H04W 4/001 455/419 |

OTHER PUBLICATIONS

Wikipedia, "Mobile Payment", http://en.wikipedia.org/wiki/Mobile_payment#SMS.2FUSSD-based_transactional_payments, Sep. 23, 2013, 9 pages.

* cited by examiner

*Primary Examiner* — Vernal U Brown

(57) ABSTRACT

A device is configured to receive a text message sent by a user device to a centralized address. The text message includes text describing a command to be executed by a client device. The device obtains identification information identifying the user device based on the text message. Additionally, the device determines the client device associated with the user device based on the user identification information. The device generates the command described in the text message and provides the command to the client device for execution of the command.

20 Claims, 9 Drawing Sheets

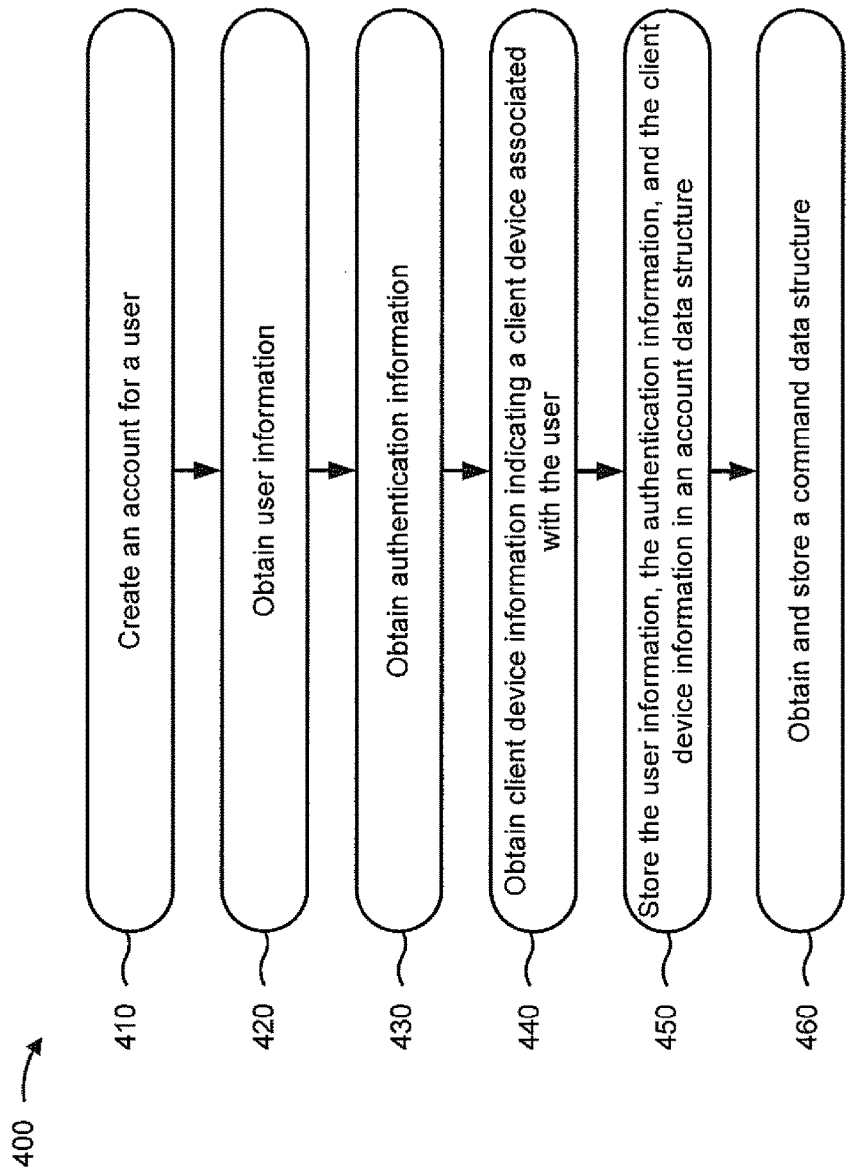

FIG. 5A

| Account Field 510 | User Identifier Field 520 | Password Field 530 | Client Device Address Field 540 | Client Device Type Field 550 |
|---|---|---|---|---|
| 08731 | 674-555-0174 | Password123 | 216.287.21.179 | DVR model A |
| | 312-555-7182 | | 63.641.2.37 | Thermostat model B |
| | dad@email.com | 12341234 | 79.88.3.274 | Refrigerator model C |
| | mom@email.com | | 36.88.22.831 | Coffee Pot model D |
| | | | 123.55.74.31 | Security System model E |

500

| Client Device Type Field 570 | Command Description Field 580 | Command Field 590 |
|---|---|---|
| DVR model A | record | command123 |
| | cancel recording | command456 |
| | delete recorded program | command789 |
| DVR model B | turn on | commandABC |
| | turn off | commandDEF |

560

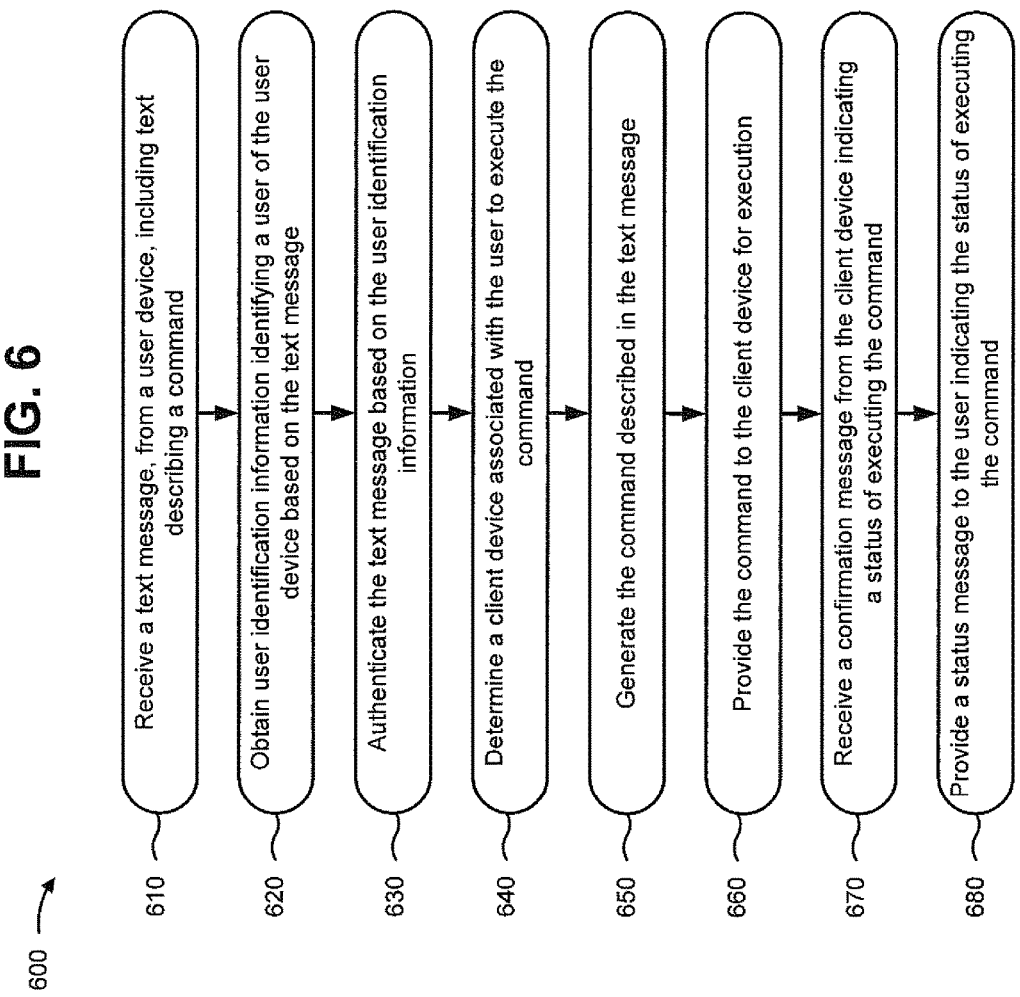

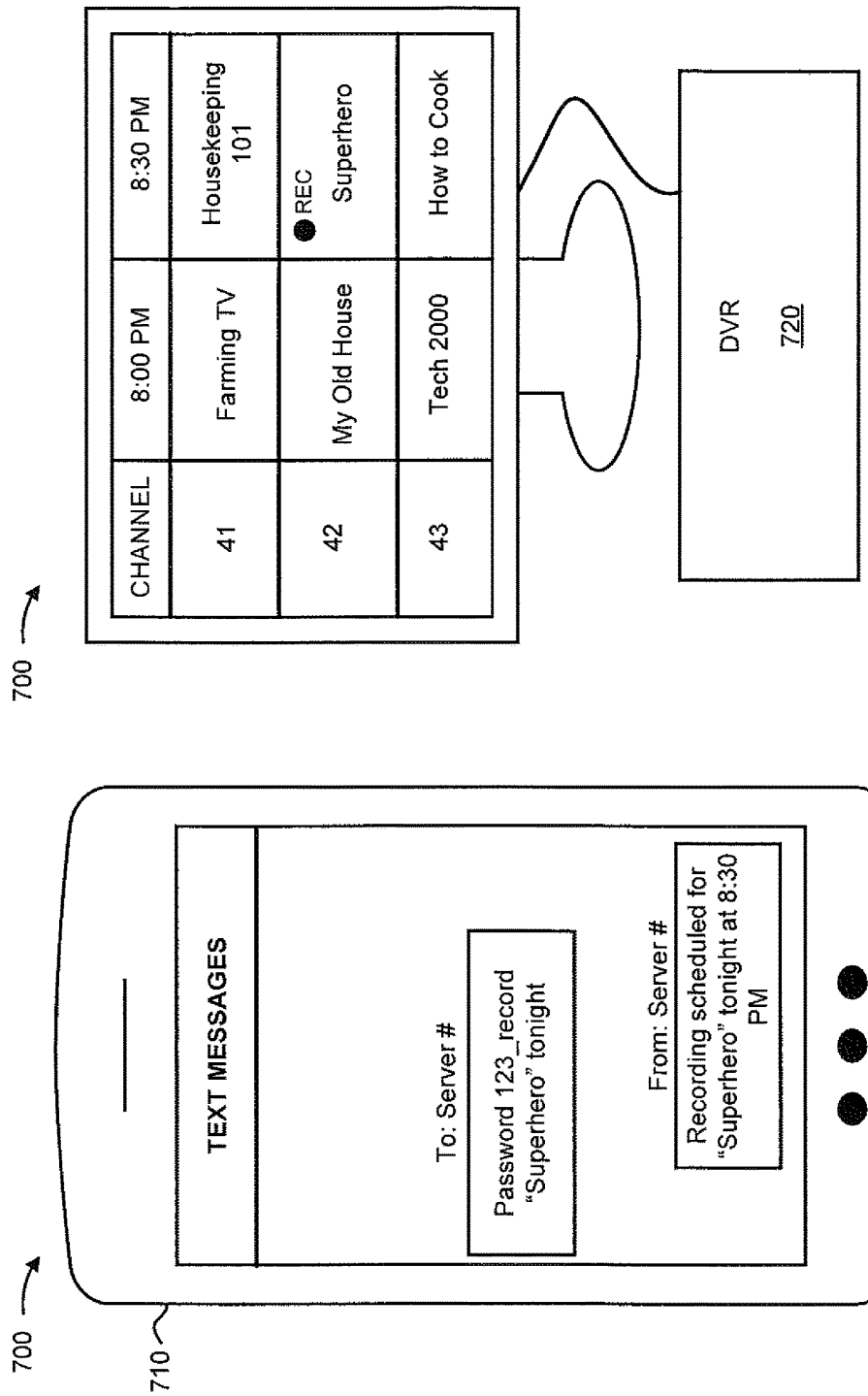

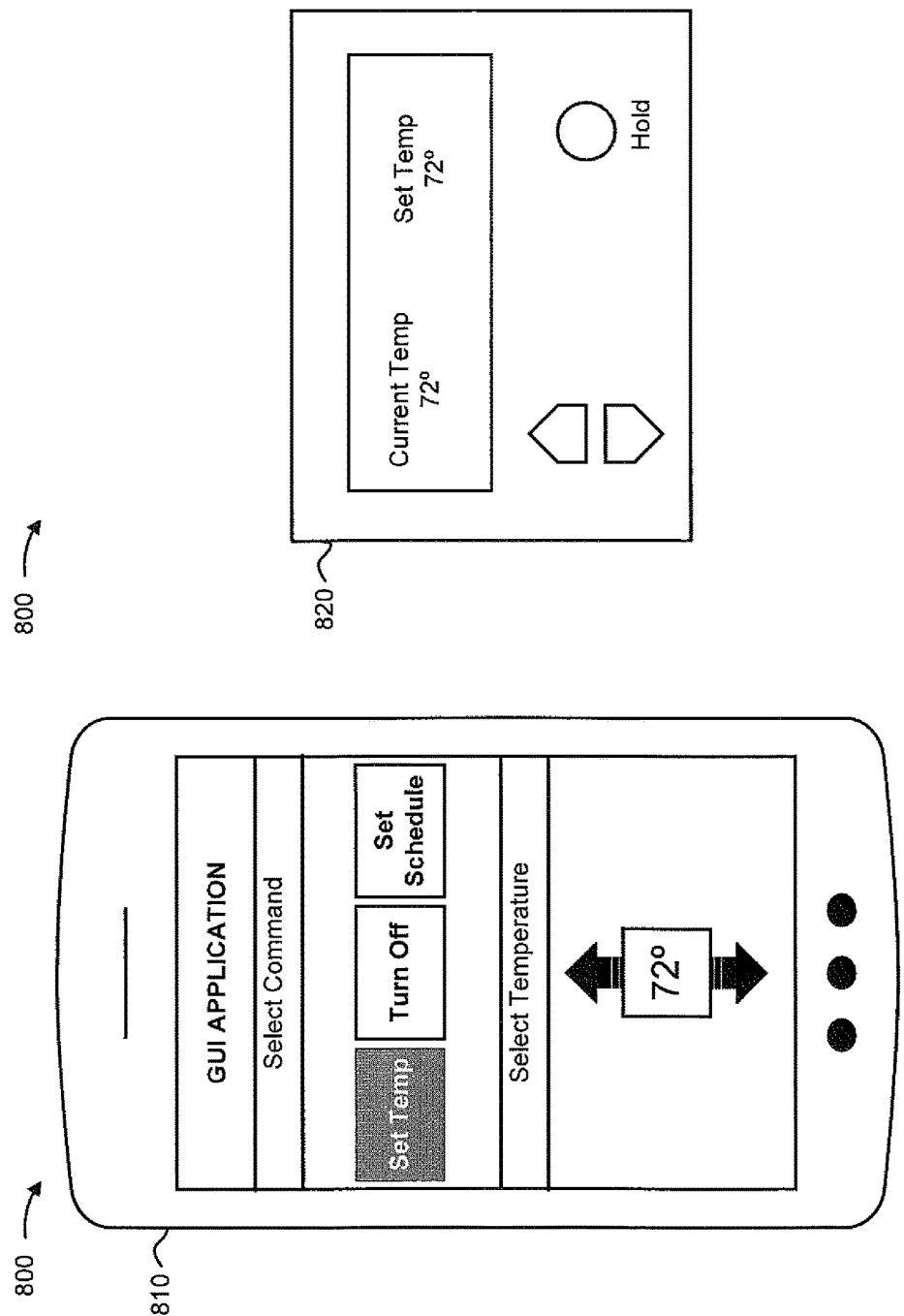

REMOTE CONTROL OF A DEVICE VIA TEXT MESSAGE

BACKGROUND

User devices have been used by users to remotely control a device over a network. Remotely controlling the device may require a user to access a website via the Internet and navigate an interface to remotely control the device. For example, a user may use an Internet browser to access a website provided by the device owner to remotely control the device.

BRIEF DESCRIPTION OF THE DRAWINGS

FIG. 4 is a flowchart of an example process for storing an account data structure and a command data structure;

FIG. 5A is a diagram of an example account data structure relating to the process shown in FIG. 4;

FIG. 6 is a flowchart of an example process of providing a command to a client device using a text message;

FIGS. 7A and 7B are diagrams of an example implementation relating to the example process shown in FIG. 6; and FIGS. 8A and 8B are diagrams of an example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

A user of a user device, such as a smart phone, may use the user device to remotely control a client device over a network. For example, the user device may be used to remotely instruct a user's digital video recorder ("DVR") to record a television program. However, connecting to the Internet and navigating a website to control the DVR may be time consuming and confusing. For example, the user may not be familiar with the website. Moreover, a user may be charged a data fee by a service provider for accessing the Internet on the user device. Alternatively, the user device may not have access to the Internet, and thus may not be able to access the website. Implementations described herein may assist the user to remotely control a client device over a network by using a text message to remotely control the client device.

Figure 1:
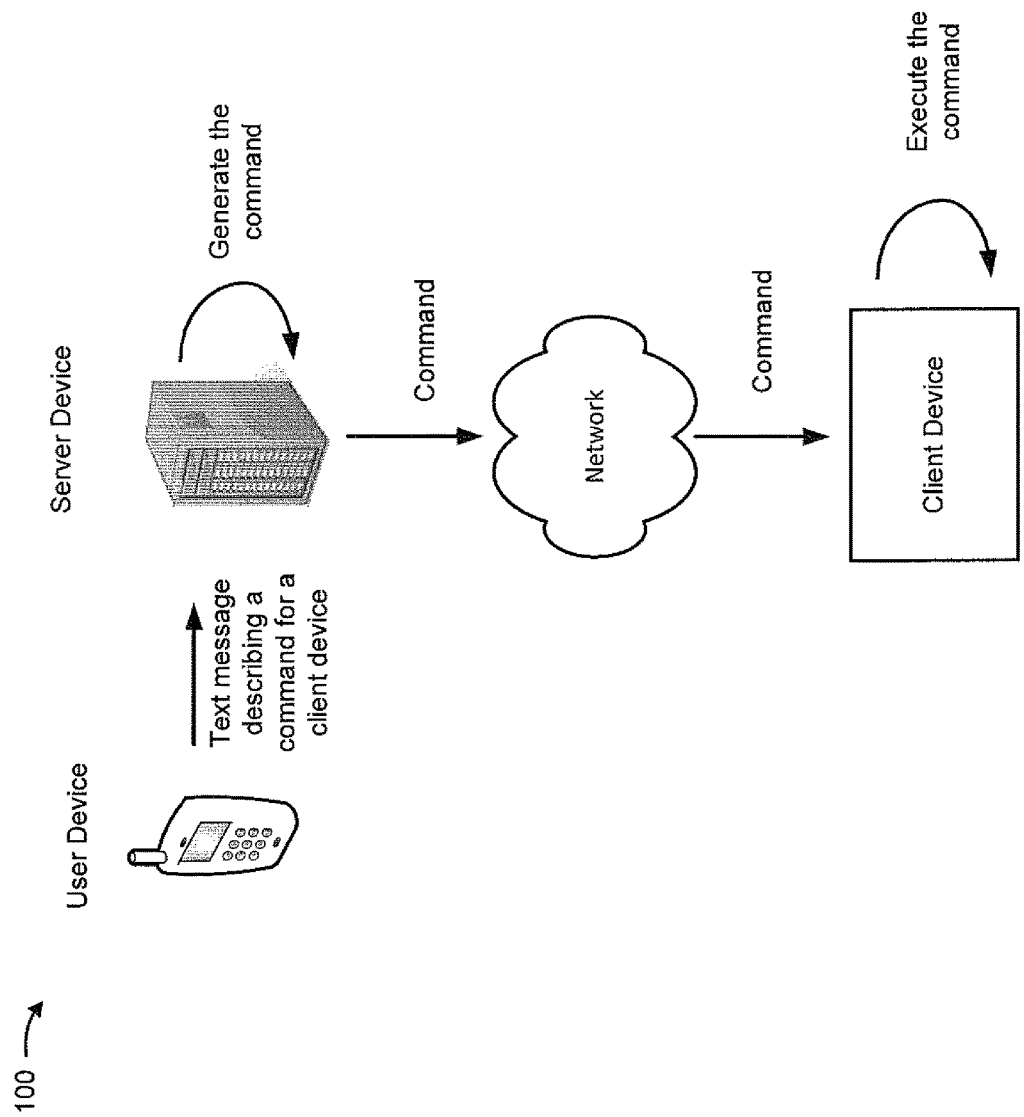
FIG. 1 is a diagram of an overview of an example implementation described herein.

FIG. 1 is a diagram of an overview of an example implementation 100 described herein. In example implementation 100, assume a user of a user device desires to remotely control a client device.

As illustrated in FIG. 1, the user device transmits a text message to a server device. For instance, the text message may be a short message service ("SMS") message that has a limited number of characters. The text message includes text describing a command to be executed by the client device, but does not actually include an executable command. For example, the text message may include the word "record" describing a command to record, but does not include an executable command to record that can be interpreted by the client device.

A server device may receive the text message and identify the described command. For example, the server device may associate the word "record" with a command to record. The server device may then generate the command (e.g., an executable command that can be interpreted by the client device) and send the command to the client device via a network for execution.

Thus, the user may remotely control the client device by sending the text message. In this way, the user can remotely control the client device while avoiding unfamiliar websites and/or data fees associated with accessing the websites.

Figure 2:
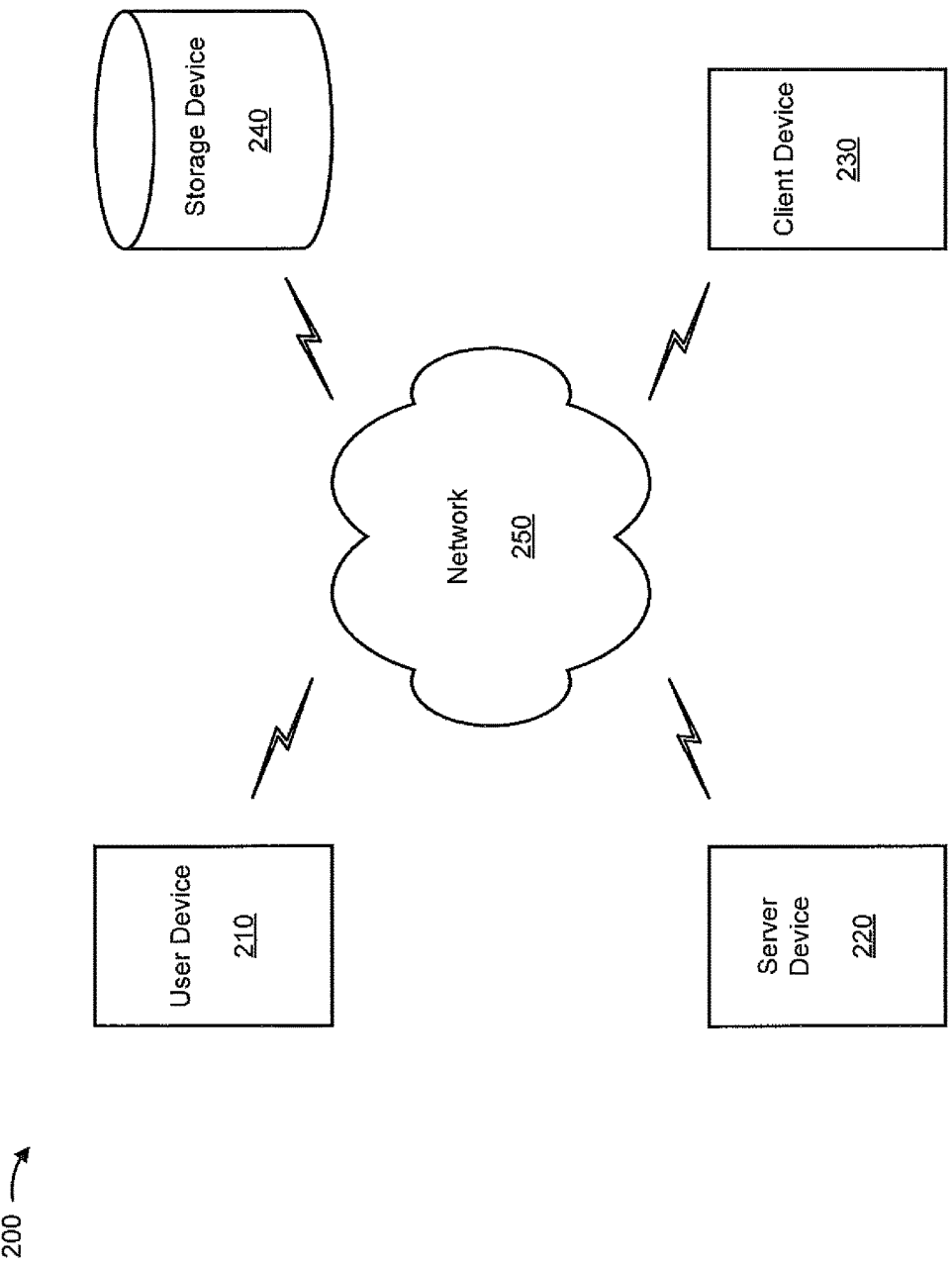
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, a client device 230, a storage device 240, and a network 250.

User device 210 may include a device capable of receiving and providing information. For example, user device 210 may include a mobile phone (e.g., a smart phone, a radiotelephone, etc.), a computing device (e.g., a desktop computer, a laptop computer, a tablet computer, a handheld computer, a gaming device, etc.), or a similar device. In some implementations, user device 210 may include a communication interface that allows user device 210 to receive information from and/or transmit information to server device 220 and/or another device in environment 200.

Server device 220 may include one or more devices capable of processing and/or routing information. In some implementations, server device 220 may include a communication interface that allows server device 220 to receive information from and/or transmit information to other devices in environment 200.

Client device 230 may include one or more devices capable of connecting to a network and executing a command. For example, client device 230 may be a set-top box, a DVR, a television, a video-on-demand server, a streaming content server, a thermostat, an appliance (e.g., a refrigerator, a stove, an oven, a microwave, a coffee maker, etc.), a security system, a car, etc. In some implementations, client device 230 may include a communication interface that allows client device 230 to receive information from and/or transmit information to other devices in environment 200.

Storage device 240 may include one or more devices capable of storing data. For example, storage device 240 may store a data structure. In some implementations, storage device 240 may include a communication interface that allows storage device 240 to receive information from and/or transmit information to other devices in environment 200.

Network 250 may include one or more wired and/or wireless networks. For example, network 250 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 250 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
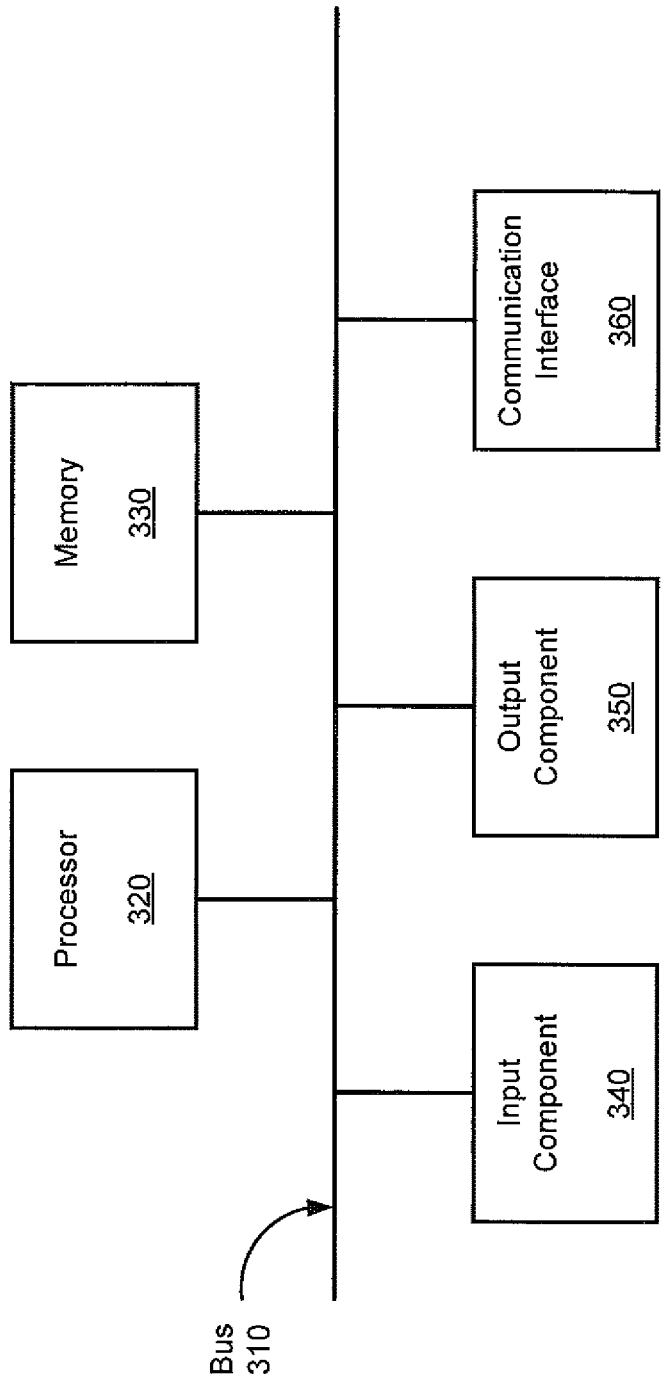
FIG. 3 is a diagram of example components of one or more devices of FIG. 2.

FIG. 3 is a diagram of example components of a device 300. Device 300 may correspond to user device 210, server device 220, client device 230, and/or storage device 240. As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, a sensor, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, user device 210, server device 220, client device 230, and/or storage device 240 may include one or more devices 300 and/or one or more components of device 300.

FIG. 4 is a flowchart of an example process for storing an account data structure and a command data structure. In some implementations, one or more process blocks of FIG. 4 may be performed by server device 220. Additionally, or alternatively, one or more process blocks of FIG. 4 may be performed by another device or a group of devices separate from or including server device 220, such as user device 210, client device 230, and/or storage device 240.

As shown in FIG. 4, process 400 may include creating an account for a user (block 410). For example, server device 220 may create the account for the user.

In some implementations, a user may use user device 210 or another device to send a request to create the account to server device 220. Server device 220 may receive the request and create the account by generating an entry in an account data structure for the account. Server device 220 may then store the entry in the account data structure. For example, server device 220 may cause the entry of account data structure to be stored in storage device 240.

The account data structure may include fields for account information, user information, authentication information, and client device information. Service device 220 may generate the account information for the account when creating the account. The account information may be a string of characters of any length (e.g., numbers, letters, and/or symbols) that identify the account. The user information, authentication information, and client device information may be obtained by server device 220 as discussed below.

In some implementations, the account may be associated with a service with which the user is registered and may allow the user to remotely control a client device 230 associated with the service. For example, the account may be associated with a television service, a home security service, a music or video service, a home automation service, etc.

As further shown in FIG. 4, process 400 may include obtaining the user information (block 420). For example, server device 220 may obtain the user information.

In some implementations, the user may input the user information into user device 210 or another device. User device 210 or the other device may send the user information to server device 220, and server device 220 may receive the user information. Additionally, or alternatively, server device 220 may obtain the user information from another device that stores the user information (e.g., a device associated with the service provider). The other device may transmit the user information to server device 220 and server device 220 may receive the user information.

The user information may identify a user and/or a user device associated with the account. For example, the user information may include a user name, a user identification ("ID"), a user device ID, a phone number, an email address, an IP address, an instant message ("IM") address, an international mobile subscriber identity ("IMSI"), an international mobile station equipment identify ("IMEI"), a mobile equipment identifier ("MEID"), or the like.

As further shown in FIG. 4, process 400 may include obtaining the authentication information (block 430). For example, server device 220 may obtain the authentication information.

In some implementations, the user may input the authentication information into user device 210 or another device. User device 210 or the other device may send the authentication information to server device 220, and server device 220 may receive the authentication information. Additionally, or alternatively, server device 220 may obtain the authentication information from another device that stores the authentication information (e.g., a device associated with a service provider). The other device may transmit the authentication information to server device 220 and server device 220 may receive the authentication information.

The authentication information may include a password used to authenticate the text message. The password may include a string of characters (e.g., numbers, letters, symbols, etc.) of any length.

As further shown in FIG. 4, process 400 may include obtaining the client device information indicating a client device 230 associated with the user (block 440). For example, server device 220 may obtain the client device information.

In some implementations, the user may input the client device information into user device 210 or another device. User device 210 or the other device may send the client device information to server device 220, and server device 220 may receive the client device information. For example, the user may input the client device information into user device 210 by entering information about client device 230 (e.g., a make and a model of client device 230) through a user interface provided by user device 210, and/or by selecting client device 230 from a list provided to the user by user device 210. User device 210 may then transmit the client device information to server device 220. Additionally, or alternatively, the user may take a picture of client device 230 (e.g., a picture of a bar code and/or serial number on client device 230) and use user device 210 to transmit the picture to server device 220. Server device 220 may receive the picture and determine the client device information based on the picture.

Additionally, or alternatively, server device 220 may obtain the client device information from another device that stores the client device information (e.g., a device associated with a service provider). The other device may transmit the client device information to server device 220 and server device 220 may receive the client device information. For example, server device 220 may use the user information to query a service provider's server for client devices associated with the user. For instance, server device 220 may obtain client device information for a user's DVR from a cable provider's server based on the user information associated with the user.

The client device information may identify a client device and/or a client device address. For example, the client device information may include a client device name, a client device ID, a client device address used to communicate with the client device (e.g., an Internet protocol ("IP") address), a client device make and model, client device authentication information (e.g., an encryption key, a password, etc.), or the like.

As further shown in FIG. 4, process 400 may include storing the user information, the authentication information, and the client device information in the account data structure (block 450). For example, server device 220 may store the user information, the authentication information, and the client device information in the account data structure stored in server device 220 and/or storage device 240.

As further shown in FIG. 4, process 400 may include obtaining and storing a command data structure (block 460). For example, server device 220 may obtain and store the command data structure.

In some implementations, server device 220 may obtain the command data structure by generating the command data structure. Additionally, or alternatively, server device 220 may obtain the command data structure by receiving the command data structure from another device (e.g., a device associated with a manufacture or service provider associated with client device 230). For example, the other device may store the command data structure and provide the command data structure to server device 220.

In some implementations, the command data structure may include commands associated with command descriptions. The command data structure may identify a type of client device 230 that can execute the commands included in the command data structure.

Server device 220 may obtain multiple command data structures. For example, server device 220 may obtain a command data structure for each type of client device 230 (e.g., a command data structure for DVR model A and a command data structure for thermostat model B). Additionally, or alternatively, server device 220 may obtain a command data structure that can be used for multiple types of client devices (e.g., a command data structure for a refrigerator model C and for a refrigerator model D).

Server device 220 may then store the obtained data structure(s) in a memory of server device 220 and/or storage device 240.

While a series of blocks has been described with regard to FIG. 4, the blocks and/or the order of the blocks may be modified in some implementations. Additionally, or alternatively, non-dependent blocks may be performed in parallel.

FIG. 5A is a diagram of an example account data structure 500 relating to process 400 shown in FIG. 4. Account data structure 500 may include an account field 510, a user identifier field 520, a password field 530, a client device address field 540, and/or a client device type field 550. Account data structure 500 may be stored in a memory of server device 220 and/or storage device 240.

Account field 510 may include the account information identifying an account. The account information may include any string of characters that identify the account (e.g., numbers, letters, and/or symbols). For example, as shown in FIG. 5A, account field 510 may include an account number "08731." Server device 220 may populate account field 510 based on the account information obtained at block 410.

User identifier field 520 may identify a user and/or a user device 210 associated with the account. For example, the user identifier field 520 may include a user device ID, a phone number, an email address, an IP address, an IM address, an IMSI, an IMEI, a MEID, or the like. Server device 220 may populate user identifier field 510 based on the user information obtained at block 420.

One or more user devices 210 and/or users may be identified in user identifier field 520. For example, a user may have user multiple devices 210 (e.g., a phone, a laptop computer, a desktop computer, etc.) that may be used to send a text message to remotely control client device 230. Additionally, or alternatively, multiple users (e.g., a mom, a dad, and a child) may each be authorized to remotely control client device 230. For example, as shown in FIG. 5A, user identifier field 520 may include phone numbers (e.g., 674-

555-0174 and 312-555-7182) and email addresses (e.g., dad@email.com and mom@email.com). Thus, multiple users and/or user devices 210 may be associated with the account.

Password field 530 may identify a password associated with the account. In some implementations, server device 220 may use the password to authenticate a text message. The password may include any string of characters (e.g., numbers, letters, symbols, etc.). Server device 220 may populate password field 530 based on the authentication information obtained at block 430.

Password field 530 may include one or more passwords. In some implementations, each password may be associated with one or more client devices 230, users, and/or user devices 210. For example, as shown in FIG. 5A, a password "password123" may be associated with a user's DVR model A (e.g., client device 230). Accordingly, password "password123" would be required to authenticate a text message to remotely control the user's DVR model A. As further shown in FIG. 5A, a password "12341234" may be associated with the user's thermostat model B, refrigerator model C, coffee pot model D, and/or security system model E. Accordingly, password "12341234" would be required to authenticate a text message to remotely control the user's thermostat model B, refrigerator model C, coffee pot model D, and/or security system E. Therefore, the user may include a different password in a text message to control the user's thermostat model B than in a text message to control the user's DVR model A.

Client device address field 540 may identify a client device address associated with client device 230. Server 220 may use the client device address to communicate with client device 230. For example, as shown in FIG. 5A, the client device address may be an IP address associated with client device 230 (e.g., 216.287.21.179). In some implementations, client device address field 540 may include one or more client device addresses associated with the account. For example, client device address field 540 may include a client device address for each client device 230 associated with the account. Server device 220 may populate client device address field 540 based on the client device information obtained at block 440.

Client device type field 550 may identify a type of client device 230 associated with the account. The type of client device 230 may include a make and a model of client device 230, a serial number of client device 230, a name of client device 230, or the like. The type of client device 230 may be associated with a client device address in client device address field 540. For example, as illustrated in FIG. 5A, client device type field 550 may include "DVR model A" and be associated with the IP address "216.287.21.179" in client device address field 540. Client device type field 550 may identify multiple types of client devices 230. For example, client device type field 550 may identify a type of client device 230 for each client device 230 associated with the account. Server device 220 may populate client device type field based on the client device information obtained at block 440.

Server device 220 may use account data structure 500 to identify an account associated with a user and/or a user device 210 that sends a text message, to authenticate the text message, to identify an address of a client device 230 associated with the account, and/or to identify a type of client device 230.

Figure 5B:
FIG. 5B is a diagram of an example command data structure relating to the process shown in FIG. 4.

FIG. 5B is a diagram of an example command data structure 560 relating to process 400 shown in FIG. 4. Command data structure 560 may include a client device type field 570, a command description field 580, and/or a command field 590. Command data structure 560 may be stored in a memory of server device 220 and/or storage device 240.

Client device type field 570 may identify a type of client device 230 that may execute commands identified in command data structure 560. The type of client device 230 may include a make and a model of client device 230, a serial number of client device 230, a name of client device 230, or the like. Client device type field 570 may include one or more types of client devices 230. For example, as illustrated in FIG. 5B, client device field 570 may indicate DVR model A and DVR model B. Accordingly, DVR model A and DVR model B would each be able to execute the commands identified in command data structure 560.

Command description field 580 may identify text describing a command. The text describing the command may include any string of characters (e.g., numbers, letters, symbols, etc.). Command description field 580 may include one or more descriptions. Each description may be associated with a command. For example, as illustrated in FIG. 5B, command description field 580 may identify the descriptions "record," "cancel recording," "delete recorded program," "turn on," and/or "turn off."

Command field 590 may identify a command. The command may include an executable command and/or instructions that can be interpreted by client device 230. Command field 590 may include one or more commands. Each command may be associated with a command description. For example, as illustrated in FIG. 5B, a command "command123" identified in command field 590 may be associated with a command description "record" identified in command description field 580.

Server device 220 may use command data structure 560 to identify a command described in a text message that a type of client device 230 may execute.

FIG. 6 is a flowchart of an example process 600 of providing a command to client device 230 using a text message. In some implementations, one or more process blocks of FIG. 6 may be performed by server device 220. Additionally, or alternatively, one or more process blocks of FIG. 6 may be performed by another device or group of devices separate from or including server device 220, such as user device 210, client device 230, and/or storage device 240.

As shown in FIG. 6, process 600 may include receiving a text message, from user device 210, including text describing a command (block 610). For example, server device 220 may receive the text message from user device 210. A user may input the text message into user device 210 and user device 210 may transmit the text message to server device 220 by sending the text message to a centralized address accessible by server device 220.

The text message may include text describing a command to be executed by client device 230. The text describing the command may include numbers, letters, symbols, and/or other characters. An executable command described by the text may not actually be included in the text message. In other words, the text describing the command may be non-executable and may not include instructions that can be interpreted by client device 230 to execute the described command. For example, the text message may include the text "record." The text message may include the characters "r," "e," "c," "o," "r," and "d," but may not include executable instructions to record.

The text describing the command may include an object of the command. For example, the text describing the command may include "record Superhero," where "Superhero" is a TV show. Thus, the show "Superhero" would be an object of the command to record.

In some implementations, the text message may include text describing an account (e.g., an account name and/or an account number), a password, a user device 210 (e.g., a user ID, a user device ID, a phone number, etc.), and/or a client device 230 to execute the command (e.g., a client device ID, a client device address, a client device name, etc.).

The text message may be a SMS message, a multimedia messaging service ("MMS") message, an email, an instant message, and/or any other message that includes text. When the text message is a SMS message, user device 210 may transmit the SMS message without access to the Internet. Thus, user device 210 may transmit the text message without being connected to the Internet and may also avoid the cost of sending a message over the Internet. The user may input the text of the text message into user device 210 using a SMS application, a MMS application, an email application, an instant message application, and/or another application that allows the user to input text.

Additionally, or alternatively, user device 210 may have a graphical user interface (GUI) application installed that allows the user to create a text message independent of inputting text. For example, the GUI application may identify client devices and/or commands from which the user may select. The GUI application may create a text message based on the user's selection and user device 210 may transmit the text message to server device 220.

Server device 220 may provide the GUI application to user device 210. User device 210 may receive and install the application, thereby allowing a user to use the application to create a text message. The GUI application may include information corresponding to an account associated with user device 210. For example, the GUI application may provide the user with a list of client devices 230 to choose from that are identified in an account data structure associated with user device 210. Moreover, the GUI application may store a password associated with the account. Thus, the GUI application may include the password in the generated text message without the user having to type in the password.

The text message may or may not be received by server device 220 in an original form sent by user device 210. For example, user device 210 may send the text message as a SMS message. However, the text message may be converted into an email by another device, and server device 220 may receive the text message as the email.

In some implementations, the text message may have a predetermined format used to distinguish between different types of information described in the text message. For example, assume a text message includes text describing a password and a command. The text message may have a format where the password is described first and separated from the description of the command by an underscore ("_"). For instance, assume a user wants to record a television show "Superhero." The text message may have the format "password123_record Superhero." Thus, the text message format may distinguish between text describing the password (e.g., password123) and text describing the command (e.g., record Superhero). When user device 210 uses the GUI application to generate the text message, the GUI application may generate the text message in the predetermined format without the user having to input the text in the predetermined format.

In some implementations, user device 210 may send the text message to a centralized address accessible by server device 220. For example, the centralized address may be a phone number, an email address, and/or an instant message address at which server device 220 may receive text messages. User device 210 may send a text message to the centralized address to control more than one client device 230 associated with an account (e.g., a DVR and a thermostat). Additionally, or alternatively, more than one user device 210 associated with more than one account may send text messages to the centralized address to control client devices 230 associated with the accounts. In other words, users associated with different accounts may each send a text message to the same centralized address to control the users' respective client devices 230.

As further shown in FIG. 6, process 600 may include obtaining user identification information identifying a user of the user device based on the text message (block 620). For example, server device 220 may obtain the user identification information based on the text message. The user identification information may include a user device ID, a phone number, an email address, an IP address, an IM address, an international mobile subscriber identity ("IMSI"), an international mobile station equipment identify ("IMEI"), a mobile equipment identifier ("MEID"), a user name, a user device name, an account ID, etc.

In some implementations, server device 220 may use a caller ID service to obtain the user identification information. For example, server device 220 may obtain a phone number of user device 210 that sent the text message using the caller ID service. Additionally, or alternatively, server device 220 may obtain the user identification information based on text in the text message. For example, the text message may include text describing the user identification information (e.g., text describing an account, user device 210, and/or a user).

As further shown in FIG. 6, process 600 may include authenticating the text message based on the user identification information (block 630). For example, server device 220 may authenticate that the text message came from user device 210 and/or a user associated with an account. Server device 220 may authenticate the text message by determining whether the user identification information obtained at block 620 corresponds to the user identification information in an account data structure associated with the account.

In some implementations, a password may also be used to authenticate the text message. As previously discussed, the text message may include text describing a password. The password and the user information may be used together to authenticate the text message. For example, the user identification information may be used to identify an account in the account data structure. The password in the text message may then be checked against a password in the account data structure corresponding to the account. The text message may be authenticated if the password in the text message matches the password in the account data structure.

As further shown in FIG. 6, process 600 may include determining a client device 230 associated with the user based on the user identification information (block 640). For example, server device 220 may identify an account and/or a user based on the user identification information obtained at block 620. Server device 220 may then determine a client device 230 associated with the identified account and/or user using the account data structure.

When multiple client devices 230 are associated with the same account, further information may be needed to determine which client device 230 may be used to execute the command. For example, the text message may include text describing client device 230. Thus, client device 230 may be determined based on the text describing client device 230. Additionally, or alternatively, the text message may include text describing a password which may be associated with a particular client device 230. For example, FIG. 5A illustrates password "password123" being associated with only DVR model A. Thus, client device 230 may be determined based on the password in the text message. Additionally, or alternatively, the command described in the text message may only correspond to a command executable by one of client devices 230 associated with the account. For example, assume the account is associated with a DVR and a thermostat, and the text message includes text describing a command to "set temperature." Server device 220 may determine the thermostat to be the determined client device 230 because a command data structure indicates that the thermostat may execute the command to "set temperature" while the DVR may not execute the command to "set temperature."

As further shown in FIG. 6, process 600 may include generating the command described in the text message (block 650). For example, server device 220 may generate the command. As previously discussed, the text message may include text, such as numbers, letters, symbols, and/or other characters. However, the text describing the command may be non-executable and may not include instructions that can be interpreted by client device 230 to execute the described command. Accordingly, generating the command may include generating an executable command and/or instructions that can be interpreted by client device 230.

In some implementations, server device 220 may use a command data structure to generate the command. For example, to generate the command, server device 230 may search the command data structure associated with client device 230 determined at block 640. Server 220 may search the command data structure for a command description matching the text in the text message describing the command. Server device 220 may obtain the command associated with a command description that matches the text describing the command in the text message.

The text message may include text describing an object of the command. In some implementations, the command data structure may further include objects for the commands associated with a description of the objects. An object for a command may be a content, a content identifier, or a setting associated with the command. Thus, server 220 may generate the command based on the object described in the text message by identifying an object in the command data structure associated with the description of the object in the text message.

For example, a command data structure associated with a streaming content server (i.e., client device 230) may include commands, such as "add to queue," "remove from queue," "add to playlist," "add station," etc. The command data structure may also include objects for the commands, such as names of movies, TV shows, songs, actors, artists, etc. For example, a text message may include the text "add Superhero to playlist." Server device 220 may use the command data structure to identify the "add to playlist" command and that the TV show "Superhero" is the object of the command. Accordingly, server device 220 may generate a command to add "Superhero" to the user's playlist using the command data structure.

As another example, a command data structure associated with a thermostat (i.e., client device 230) may include commands, such as "set temperature," "hold temperature," "set schedule," "turn heat on," "turn heat off," "turn air conditioner on," "turn air conditioner off," etc. The command data structure may also include objects for the commands such as specific temperatures. For example, a text message may include the text "set temperature to 72°." Server device 220 may use the command data structure to identify the "set temperature" command and that "72°" is the object of the command. Accordingly, server device 220 may generate a command for the thermostat to set the temperature to 72° using the command data structure.

Additionally, or alternatively, a command data structure associated with a DVR (i.e., client device 230) may include commands, such as "record," "play," "pause," "stop," "fast forward," "rewind," "cancel recording," etc. The command data structure may include objects for the commands such as TV shows, movies, videos, and music. Additionally, or alternatively, the command data structure associated with the DVR may include a schedule of broadcast programs (e.g., TV shows, movies, live events, etc.). For example, the schedule may indicate a channel, a time, and a day that a program is broadcast. The schedule may also indicate information about the program (e.g., an actor, a new episode, a rating, etc.). For example, a text message may include the text "record Superhero." Server device 220 may use the command data structure to identify the "record" command and that the TV show "Superhero" is the object of the command. Accordingly, server device 220 may generate a command for the DVR to record "Superhero" using the command data structure.

In some implementations, the command data structure may be used to interpret the text describing the command and identify a proper command. For example, assume the text message includes the text "record Superhero tonight." Server device 220 may search a TV listing to determine a time and a channel that "Superhero" is on tonight. Accordingly, server device 220 may generate the appropriate command to record "Superhero" at the specific time and channel that the show is on tonight.

Furthermore, server device 220 may use a spell check application to correct spelling errors in the text message. In this way, server device 220 may search the command data structure for a command the user intended even if the text describing the command includes an error. Additionally, or alternatively, server device 220 may identify synonyms associated with description of the command and use the synonyms to search the command data structure for a command the user intended.

To generate the command, server device 220 may generate authentication information used by client device 230 to authenticate the command. For example, the command data structure may indicate an encryption key to be used to encrypt the command and/or an authentication code to be sent with the command. Accordingly, the generated command may include the authentication information.

As further shown in FIG. 6, process 600 may include providing the command to the client device for execution (block 660). For example, server device 220 may send or transmit the command to client device 230 using the client device address information (e.g., an IP address) associated with the account.

As further shown in FIG. 6, process 600 may include receiving a confirmation message from client device 230 indicating a status of executing the command (block 670). For example, server device 220 may receive the confirmation message that was sent by client device 230. The confirmation message may indicate that the command has been executed or has been scheduled to be executed. Additionally, or alternatively, the confirmation message may indicate that the command could not be executed. In such a case, the confirmation message may indicate an action the user may perform before the command can be executed. For example, assume a text message includes the text "record Superhero." Further, assume the user's DVR is at capacity and cannot record more programs. Accordingly, the confirmation message may indicate that programs recorded on the user's DVR need to be deleted before "Superhero" can be recorded.

As further shown in FIG. 6, process 600 may include providing a status message to the user indicating the status of executing the command (block 680). For example, server device 220 may provide the status message to user device 210. Additionally, or alternatively, server device 220 may provide the status message to another device associated with the user that sent the text message.

The status message may indicate the status indicated in the confirmation message. Additionally, or alternatively, the status message may indicate whether server device 220 could generate a command based on the text message. For example, server device 220 may generate a message "command not recognized" when the command described in the text message could not be found in the command data structure. Additionally, or alternately, server device 220 may generate a message "authentication failed" if the text message included an incorrect password. In some implementations, the status message may request user device 210 to confirm a command. For example, if the text message included the text "record Superhero," the status message may include text requesting the user device to confirm a more specific command (e.g., "record Superhero on channel 42 at 8:30 PM on December 7").

While a series of blocks has been described with regard to FIG. 6, the blocks and/or the order of the blocks may be modified in some implementations. Additionally, or alternatively, non-dependent blocks may be performed in parallel.

FIGS. 7A and 7B are diagrams of an example implementation 700 relating to process 600 shown in FIG. 6. In example implementation 700, a command to record a program may be provided to a DVR using a text message.

In FIG. 7A, assume a user has an account and a server stores an account data structure for the user's account. Assume that the account data structure includes a phone number for a mobile phone 710, a password associated with the account, and information identifying a DVR 720.

Assume the user uses mobile phone 710 to input and send a text message to a server phone number (i.e., a centralized address). The text message may include text describing a password and a command to be executed by DVR 720. As illustrated in FIG. 7A, the text message may include the text "password123_record Superhero tonight."

The server receives the text message sent to the server phone number and obtains the phone number of mobile phone 710 using caller ID. Based on the format of the text, the server obtains the password "password123" from the text of the text message. The server may then authenticate the text message by comparing the obtained phone number and password with the phone number and password in the account data structure. The account data structure may also indicate a kind of DVR and an IP address for DVR 720.

Based on the format of the text, the server identifies the text "record Superhero tonight" as the description of the command. The server may then search a command data structure associated with the kind of DVR. For example, the command data structure may include "record" as a description of a command associated with a command to record. Furthermore, the command data structure may include a programming schedule indicating that "Superhero" is scheduled to be broadcast tonight at 8:30 PM on channel 42. Accordingly, the server may identify the broadcast of "Superhero" at 8:30 PM on channel 42 as the object of the command. Accordingly, the server may generate a command to record "Superhero" at 8:30 PM tonight using the command data structure and provide the command to DVR 720 using the IP address indicated in the account data structure.

As shown in FIG. 7B, DVR 720 may receive the command and execute the command by scheduling a recording for "Superhero" at 8:30 on channel 42.

Furthermore, DVR 720 may send a confirmation message to the server indicating that the recording has been scheduled by DVR 720. The server may then send a status message to mobile phone 710 indicating that the recording has been scheduled. For example, as illustrated in FIG. 7A, mobile phone 710 may receive a text message including the text "recording scheduled for 'Superhero' tonight at 8:30 PM" as the status message. Accordingly, the user may be made aware that the command described in the text message is executed and/or scheduled to be executed.

Thus, the user may remotely control DVR 720 using a text message.

FIGS. 8A and 8B are diagrams of an example implementation 800 relating to process 600 shown in FIG. 6. In example implementation 800, a command to set a temperature may be provided to a thermostat using a text message.

In FIG. 8A, assume a user uses a GUI application installed on user device 810 to create a text message. The user selects a command "set temp" from the commands presented by the GUI application and selects a temperature 72°. The GUI application creates a text message including text describing the "set temp" command and that the temperature should be set to 72°. For example, the text message created by the GUI application may include the text "set temp to 72°." User device 810 sends the text message to a server phone number (i.e., a centralized address).

The server receives the text message sent to the server phone number and obtains a phone number associated with user device 810 using caller ID. The server uses an account data structure to determine an account associated with the phone number and determine a thermostat 820 associated with the account. The server may then generate a command using a command data structure, associated with thermostat 820, by obtaining a command associated with a description to "set temp." The server may provide the command to thermostat 820 using address information of thermostat 820 in the account data structure.

As shown in FIG. 8B, thermostat 820 may receive the command from the server and execute the command by setting the temperature to 72°. Accordingly, the user may remotely control thermostat 820 using a text message.

Implementations described herein may assist a user in remotely controlling a device over a network. For example, allowing a user to use a text message to remotely control a device over the network may be easier, cheaper, and more convenient than other methods.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive a text message sent by a user device to a centralized address accessible by the device,
         the text message including:
            text describing a command to be executed by a client device, and
            text describing authentication information for authenticating the user device,
         the text message being generated, by a user interface application provided on the user device, in a predetermined format used to distinguish between different types of information described in the text message,
            the predetermined format distinguishing the text describing the command and the text describing the authentication information;
      obtain identification information identifying the user device based on the text message;
      determine that the client device is associated with the user device based on the identification information;
      search a data structure for a command description matching the text describing the command,
         the data structure associating the command description with an executable command that is executable by the client device, and
         the executable command being associated with the command described in the text message;
      provide the executable command to the client device for execution of the executable command; and
      provide, to the user device and based on providing the executable command to the client device, a particular text message indicating a schedule associated with executing the executable command by the client device.

2. The device of claim 1, where the text message is a short message service message.

3. The device of claim 1, where the one or more processors are further to:
   receive a plurality of text messages sent by the user device to the centralized address accessible by the device,
      the plurality of text messages including text describing another command to be executed by another client device;
   determine that the other client device is associated with the user device based on the identification information;
   search the data structure for another command description matching the text describing the other command;
      the data structure associating the other command description with another executable command that is executable by the other client device, and
      the other executable command being associated with the other command described in the plurality of text messages; and
   provide the other executable command to the other client device for execution of the other executable command.

4. The device of claim 1, where the authentication information includes a password, and
   where the one or more processors are further to:
      authenticate the text message based on the identification information and the password.

5. The device of claim 1, where the one or more processors, when obtaining the identification information, are to:
   obtain a phone number of the user device, from which the text message is received, as the identification information.

6. The device of claim 1, where the executable command includes instructions that can be interpreted by the client device.

7. A non-transitory computer-readable medium storing instructions, the instructions comprising:
   a plurality of instructions that, when executed by a processor of a device, cause the processor to:
      receive a text message sent by a user device to a centralized address accessible by the device,
         the text message including:
            text describing a command to be executed by a client device, and
            text describing authentication information for authenticating the user device,
         the text message being generated, by a user interface application provided on the user device, in a predetermined format used to distinguish between different types of information described in the text message,
the predetermined format distinguishing the text describing the command and the text describing the authentication information;
obtain identification information identifying the user device based on the text message;
determine that the client device is associated with the user device based on the identification information;
search a data structure for a command description matching the text describing the command,
the data structure associating the command description with an executable command that is executable by the client device, and
the executable command being associated with the command described in the text message;
provide the executable command to the client device for execution of the executable command; and
provide, to the user device and based on providing the executable command to the client device, a particular text message indicating a schedule associated with executing the executable command by the client device.

8. The non-transitory computer-readable medium of claim 7, where the data structure includes a schedule of broadcast programs, and
where the plurality of instructions, when executed by the processor, further cause the processor to:
obtain the executable command based on the schedule of broadcast programs.

9. The non-transitory computer-readable medium of claim 7, where the plurality of instructions, when executed by the processor, further cause the processor to:
provide the user interface application to the user device,
the user interface application being configured to generate the text message independent of a user inputting text into the user device, and
receive the text message generated by the user interface application.

10. The non-transitory computer-readable medium of claim 7, where the plurality of instructions, when executed by the processor, further cause the processor to:
identify the client device from among a plurality of client devices based on the text in the text message.

11. The non-transitory computer-readable medium of claim 7, where the plurality of instructions, when executed by the processor, further cause the processor to:
obtain an address for the client device; and
provide the executable command to the client device based on the address for the client device.

12. The non-transitory computer-readable medium of claim 7, where the plurality of instructions, when executed by the processor, further cause the processor to:
generate an account,
the account including:
account identification information identifying the account,
the identification information identifying the user device,
the authentication information for authenticating the user device, and
client device identification information identifying the client device.

13. A method, comprising:
receiving, by a device, a text message from a user device to a centralized address accessible by the device, the text message including:
text describing a command to be executed by a client device, and
text describing authentication information for authenticating the user device, the text message being generated, by a user interface application provided on the user device, in a predetermined format used to distinguish between different types of information described in the text message,
the predetermined format distinguishing the text describing the command and the text describing the authentication information
obtaining, by the device, identification information identifying at least one of the user device or a user of the user device based on the text message;
determining, by the device, that the client device is associated with the user device based on the identification information;
searching, by the device, a data structure for a command description matching the command,
the data structure associating the command description with an executable command that is executable by the client device, and
the executable command being associated with the command included in the text message;
providing, by the device, the executable command to the client device for execution of the executable command: and
providing, by the device, to the user device, and based on providing the executable command to the client device, a particular text message indicating a schedule associated with executing the executable command by the client device.

14. The method of claim 13, further comprising:
providing a message to the user device indicating a status of executing the executable command by the client device.

15. The method of claim 13, where text message includes text describing an object of the command, and
where the method further comprises:
searching the data structure for the object described in the text message;
identifying the object based on searching the data structure; and
obtaining the executable command based on identifying the object.

16. The method of claim 13, where the text message includes text describing a record command to record a program and text describing the program to be recorded.

17. The method of claim 16, further comprising:
identifying the record command and the program from the text message;
determining a time and a channel to record based on the program; and
generating an executable record command based on the time and the channel.

18. The method of claim 13, where the executable command includes information used by the client device to authenticate the executable command.

19. The method of claim 13, further comprising:
obtaining an address for the client device; and
providing the executable command to the client device based on the address.

20. The method of claim 13, where the user device is associated with a plurality of client devices, and the method further comprises:

identifying the client device from among the plurality of client devices based on the text in the text message.

\* \* \* \* \*